No. 750,454. PATENTED JAN. 26, 1904.
J. H. HALLBERG.
SYSTEM OF ELECTRICAL DISTRIBUTION.
APPLICATION FILED OCT. 16, 1903.

NO MODEL.

WITNESSES:
J. E. Pearson
Frank O'Connor

INVENTOR
Josef H. Hallberg
BY
Geo. H. Benjamin
ATTORNEY

No. 750,454. Patented January 26, 1904.

UNITED STATES PATENT OFFICE.

JOSEF HENRIK HALLBERG, OF NEW YORK, N. Y.

SYSTEM OF ELECTRICAL DISTRIBUTION.

SPECIFICATION forming part of Letters Patent No. 750,454, dated January 26, 1904.

Application filed October 16, 1903. Serial No. 177,361. (No model.)

*To all whom it may concern:*

Be it known that I, JOSEF HENRIK HALLBERG, a citizen of the United States, residing at New York city, county and State of New York, have invented certain new and useful Improvements in Systems of Electrical Distribution, of which the following is a specification.

This invention relates to a system of distribution of the type where the generated current for distribution purposes is divided into a number of currents of given voltages, the sum of which is equal to the voltage of the original current, or, in other words, to what is known as a "multivoltage" system.

The invention consists in the means employed for effecting a balance between the loads in the several circuits of the distributing system and the currents necessary to care for such loads.

The object of my invention is to provide means for effecting an automatic balance between the several circuits of the distributing system and by means much cheaper and more effective than has heretofore been used.

The accompanying diagrams illustrate the features of my invention, in which—

Figure 1:
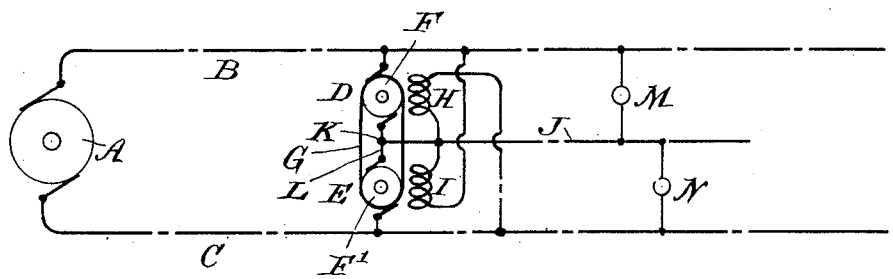
Figure 2:
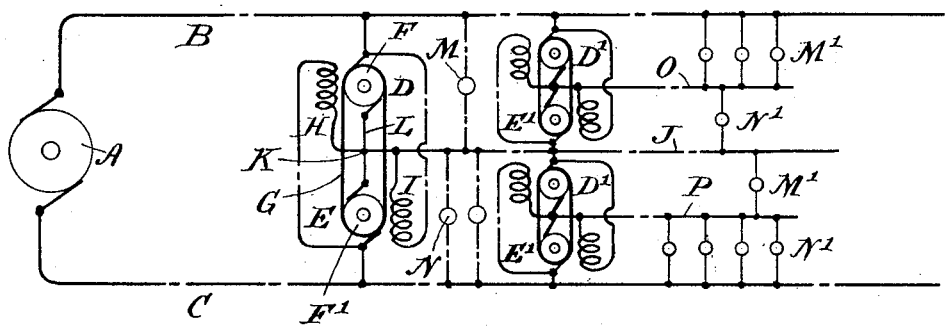

Figure 1 shows a system divided to transmit two voltages to the distributing-circuit; Fig. 2, a system adapted to transmit two and four voltages to the distributing system.

Referring to the drawings, A is the main generator; B C, main conductors which are extended through the distributing-circuit; D E, two motors having their armatures F F' mechanically connected by means of a belt G or other suitable device, through which they may be driven at the same speed.

H and I are respectively the field-windings of the motors D and E. The armatures F F' of the motors D and E are connected in series across the main conductors B C, and a third or neutral conductor J is connected at a point K to the conductor L between the armatures of the motors D E. The field-winding H for the motor D is connected across the conductors J C—*i. e.*, across the armature F'—and the field-winding I for the motor E across the conductors J B—*i. e.*, across the armature F.

M N are translating devices in the distributing-circuits.

The arrangement shown in Fig. 2 corresponds to that of Fig. 1, with the exception that the distributing-circuit is provided with five conductors B C J O P and motors D' E', connected across J and B and J and C, the conductors O and P being the neutral conductors for the motors D' E', the neutral conductor J in this case acting as a main conductor. Translating devices M' N' are connected across B and O, O and J, J and P, P and C.

The operation of my improved device is as follows: When the load between the conductor B and the neutral conductor J is equal to the load between the neutral conductor J and the conductor C, Fig. 1, the system is in balance and the motors D and E operate as two motors, introducing only such losses as are inherent when operating without loads. If the load between B and J should be cut down or modified, the system will be unbalanced and the voltage between J and C will be reduced and that between B and J increased. Under this condition the field H of motor D will receive less current, causing its armature K to revolve faster. At the same time the increase of voltage across B J will force more current through the field-coils I of motor E, thereby causing this machine to become a generator, supplying power for the unbalanced load between the conductor J and conductor C, which will again establish the equilibrium or balance of the system. By proper proportioning of the iron and field windings for these motors an absolutely automatic balance can be obtained with practically no change in the speed of the armatures of the two machines. The fact that these motors can be run at constant speed is a point of considerable practical advantage, as they may be used to operate generators or other machinery through mechanical connections, especially alternating-current generators, which require to be operated at a constant speed. It will also be understood that comparatively small motors can be used to effect the balancing in my system of distribution, as when one machine acts as a motor it drives the other machine as a generator, which supplies part of the current for the unbalanced load, the other part being supplied directly through the driving-motor armature, so that the unbalanced side of the system can be taken care of even though that side should be equal to the Watt capacity of both motors.

It will be observed from the foregoing description that two facts form the basis of the system: First, that the speed of a motor-armature will increase when the current flowing through its field is decreased, and, second, that in case where two motors driven at a given speed are connected in series across distributing-conductors and centrally to an equalizing-conductor and have their respective field-magnets connected across the armature of its opposite that variation in load in the circuit of one motor will cause the opposite motor to be driven as a generator to supply the difference in load in the opposite circuit, and thus effect the balance of the system.

Having thus described my invention, I claim—

1. A multivoltage distribution system, comprising a generator, main conductors leading therefrom, an equalizing-conductor, two motors having their armatures connected across the distribution-circuit, and centrally to an equalizing-conductor, and each its field-magnets across the armature of the opposite motor, together with means for driving the motors at a uniform speed.

2. A multivoltage distribution system, comprising a generator, a system of conductors including an equalizing-conductor, together with means for balancing the current between the conductors in the distribution system in accordance with the load; said means comprising a pair of motors driven at the same speed and having their armatures in series across the distributing-conductors and individually across a distributing-conductor and the equalizing-conductor, and the field-magnets of each motor connected across an equalizing-conductor and the main conductor opposite to that to which the armature of said motor is connected.

3. As a means for balancing the current in individual circuits of a multivoltage system, a pair of motors having their armatures driven at the same speed and connected to supply the required voltages, and the field-magnets of said motors connected in such manner that the field-magnet of a motor will receive current from the circuit in which the armature of the opposite motor is included.

In testimony whereof I affix my signature in the presence of two witnesses.

JOSEF HENRIK HALLBERG.

Witnesses:
J. E. PEARSON,
FRANK O'CONNOR.